Figure 1:
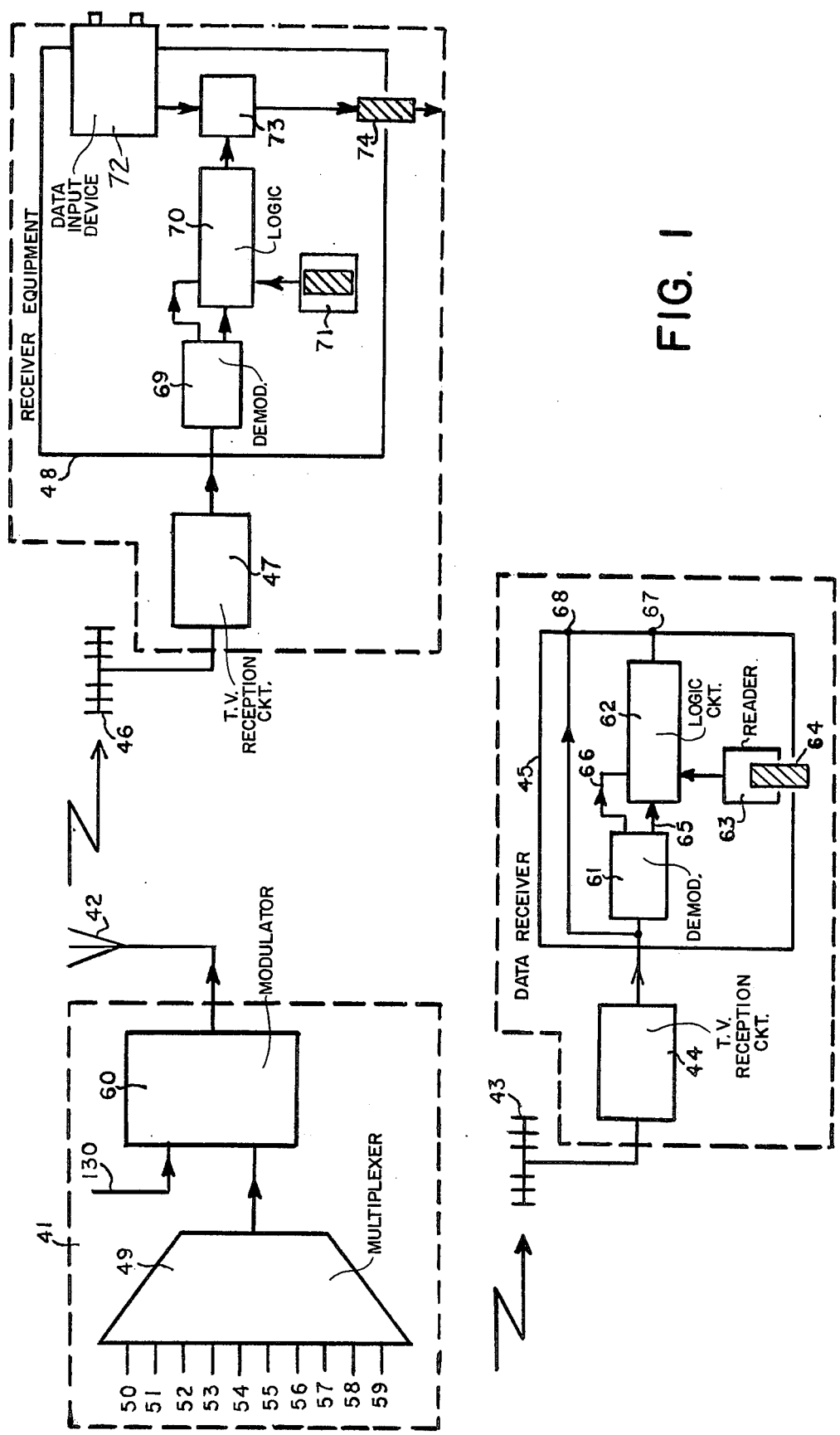

United States Patent [19]

Guinet et al.

[11] 4,058,830

[45] Nov. 15, 1977

[54] ONE WAY DATA TRANSMISSION SYSTEM

[76] Inventors: Yves Maurice Guinet, 31, Rue de Fougeres, Rennes, France, 35000; Yves Maurice Noirel, Le Chesnot-Breteil, Montfort, France, 35160

[21] Appl. No.: 689,493

[22] Filed: June 3, 1976

[30] Foreign Application Priority Data

June 6, 1975 France .................................. 75.18319

[51] Int. Cl.² .......................... H04N 1/32; H04N 1/34; H04N 1/44
[52] U.S. Cl. ...................................... 358/86; 358/114; 358/115; 358/117; 340/149 A
[58] Field of Search .................... 358/84, 86, 102, 114, 358/115, 117; 325/31; 340/149 A, 151, 152; 194/4 C, 4 E, 4G; 235/61.7 A, 61.7 B

[56] References Cited

U.S. PATENT DOCUMENTS 2,977,434   3/1961   Shanahan ............................ 358/115
3,736,369   5/1973   Vogelman .......................... 340/149 A
3,736,388   5/1973   Vogelman .......................... 340/149 A
3,890,461   6/1975   Vogelman ............................. 358/117

Primary Examiner—Robert L. Griffin
Assistant Examiner—Edward L. Coles

[57] ABSTRACT

There is provided a one-way data transmission system wherein a transmitter station transmits in the form of data packs data from a plurality of channels, the said packs being time multiplexed.

One channel amongst the plurality of channels is allotted to transmitting date information. In the receiver equipments, the dead memory stores not only the channel code, but also a subscription period information which permits to validate the channel code depending on the date information received from the date channel. Automatic dead-memory distributors are provided which receive data from a control channel transmitted by the system, like other channels. The system is compatible with television systems.

8 Claims, 7 Drawing Figures

FIG. 2

ONE WAY DATA TRANSMISSION SYSTEM

The present invention relates to a one-way data transmission system and, more particularly, a system which may be utilized with existing television broadcasting radio facilities while being compatible with television standards and possibly without disturbing normal television program broadcasting.

Information transmission television systems are already known wherein messages are transmitted in the field-blanking interval of standard visual program signal. By way of example, reference may be, in this respect, made to the following published French Patent Applications: Nos. 1 519 545, 1 541 010, 1 598 256, 1 571 216, 2 000 925, 2 014 236, 2 128 760, 2 195 139 and 2 239 832. Such a system has also been described in the British specification "Specifications of standards for information transmission by digitally coded signals in the field-blanking interval of 625-line television systems" published by the BBC, together with other British groups, October 1974. In the French article entitled "New services offered through data pack broadcasting system" (Nouveaux services offerts par un systeme de diffusion de donnees par paquets) by Y. Guinet in the French review of U.E.R. — Technique, No. 149, February 1975, a system of that type has also been described wherein it is even intended not only to make use of field-blanking interval, but possibly also use one or several full video channels.

In those systems data are arranged in packs, each pack having a prefix constituted of synchronization signals, coded signals and service signals, followed by properly said data. Data receiver equipment is provided for deriving from received video signals each data pack defined by the synchronization signals, selecting certain data packs as a function of the received coded signals, before storing them in a memory. By way of example, the said service signals would indicate the beginning of a data message, the number of the pack within the message, etc.

In those systems, besides technical problems involved in inserting data packs into video signal and extracting them therefrom, what will be assumed settled through known ways in the following, there remains problems in directing the system. First of all, the said prefix must contain a coded signal determining an individual service and ensuring that only those who are subscribers to that service can really received corresponding data. Solutions to that problem have already been described in the above mentioned documents. A second problem relates to metering such services to the subscribers. A solution to that second problem is for example described in the hereabove mentioned French Patent 1 541 010. Practically, in known systems, the two problems are separately solved.

In the data receiver equipment, there is provided a dead memory storing the code corresponding to the service which the user is subscribed to. For each received data pack, comparison is made between the dead memory code and the received data pack prefix. When they are identical, the data pack is made valid and stored in the data memory. For example the code dead memory may be either a puched card or a magnetic card that the subscriber inserts into the receiver equipment.

Metering is performed by counting and triggered by predetermined service signals. That method has the drawback to later make necessary to take counter readings at subscriber's home since only one-way transmission is considered.

In the French Patent Application No. 2 184 926, there is described a system wherein the the data pack prefix contains among other coded or service signals, a coded signal relative to a subscription period as the date. The dead memory to be inserted into the receiver equipment contains further to the above mentioned code a code relative to a subscription period. Thus in addition to the comparison regarding the code defining the service, there is another comparison to be made between the date transmitted with the prefix and the subscription period stored in the dead memory. Particularly, that second comparison must be made for each received data pack. A drawback of that system is that the prefix is longer by the bits relative to the date which reduces the amount of usable data in a pack. Furthermore, there is a larger number of bits involved in both comparisons which increase possible errors resulting in diverting some good packs.

A purpose of the present invention is to provide a one-way data transmission television system wherein a key-code or in short a key contains both the code for the desired service and information relative to a subscription period during which the key is valid, such a system avoiding the above mentioned drawbacks and allowing more usable data in a pack.

Another purpose of this invention is to provide a one-way data transmission system wherein automatic key distributors are provided which selectively deliver keys in response to simple actuations performed by a user who desires to subscribe to a service for a certain period of time.

According to a feature of this invention, there is provided a one-way data transmission system wherein the broadcasting station broadcasts in the form of data packs data delivered from a plurality of channels, the data packs from the plurality of channels being time multiplexed, each data pack including a prefix containing besides conventional synchronization and service coded signals, a coded signal, one channel amongst the plurality of channels being allotted to the broadcasting of date information, and wherein the data receiver equipment comprises a dead memory in the form of a key unit containing the channel code and subscription period information, the said data receiver equipment comprising a first portion wherein said date information received from the date channel is compared with said subscription period information contained in the said equipment key unit and which, when the comparison result is positive, delivers a first validation signal, and a second portion wherein the prefix code of each data pack is compared with the channel code contained in the said equipment key unit and which delivers a second validation signal when the comparison result is positive, said first and second validation signals being combined for validating the received data pack having caused the second validation signal to be delivered.

According to another feature, the said one-way data transmission system comprises automatic key unit distributors which each comprises a said data receiver equipment wherein the dead memory contains the code of a control channel amongst the said plurality of channels, control channel data being broadcasted by the broadcasting station as normal and date channel data, each said distributor including receiving means for receiving each control channel data pack which contains date information and control information in order to combine them with data resulting from actuations applied to the said distributor by a user so as to deliver a key unit corresponding to actuations performed by the user after he has deposited into the said distributor the required number of coins or banknotes corresponding to the channel and the subscription period selected by said actuations.

According to another feature, control channel data are constituted of date information followed by a sequence of channel codes, each channel code being preceded by the number of the associated channel and followed by the period unity rate for the associated channel, and the said receiving means includes a comparator comparing the number of the channel dialed by the user with the channel numbers preceding the channels codes in the said sequence, an extractor extracting date information, channel code and rate when the said comparator delivers a positive output, a display device displaying the extracted rate, a calculation circuit delivering subscription information from extracted date information and user's actuations, and a processor processing the extracted channel code and the said subscription information for, after the user has paid according to the displayed rate, delivering a key unit.

According to another feature, the said automatic distributor includes a control channel data memory which is periodically up-dated with received control channel data, the said memory being associated with a scanner which reads out the memory when the user actuates the said distributor, data read out of the memory being transmitted to the said receiving means.

Figure 3:
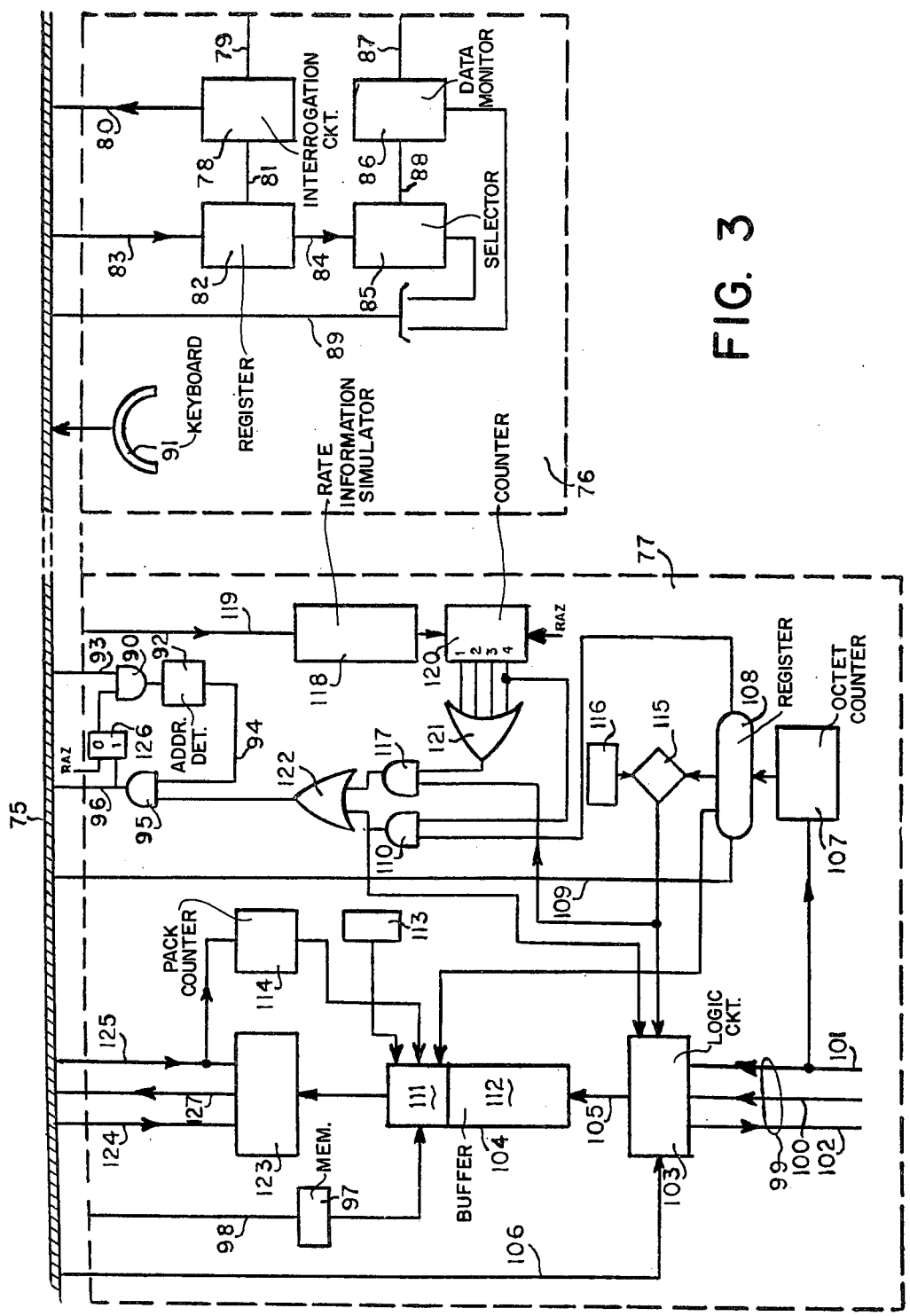
Figure 5:
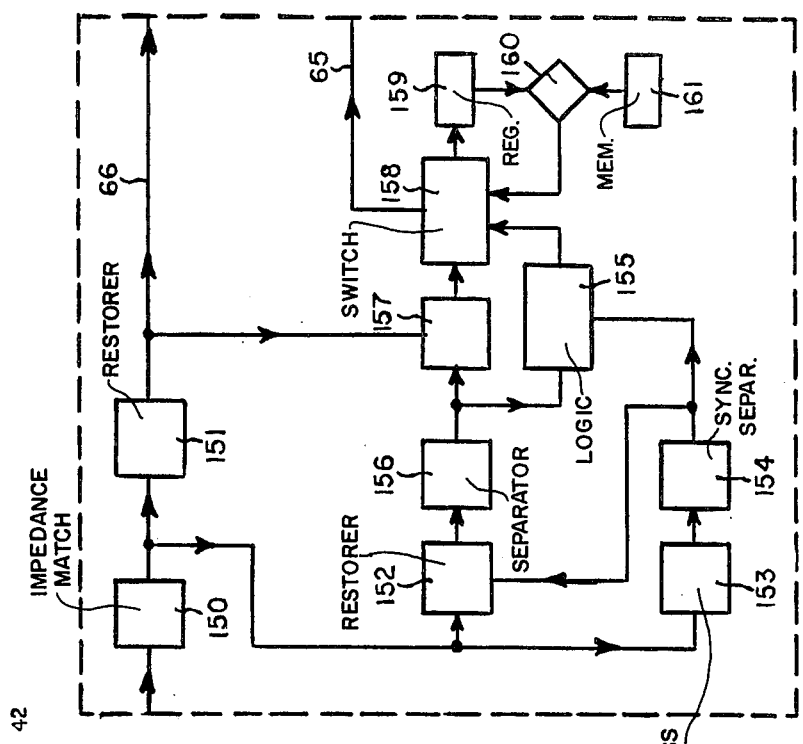
Figure 4:
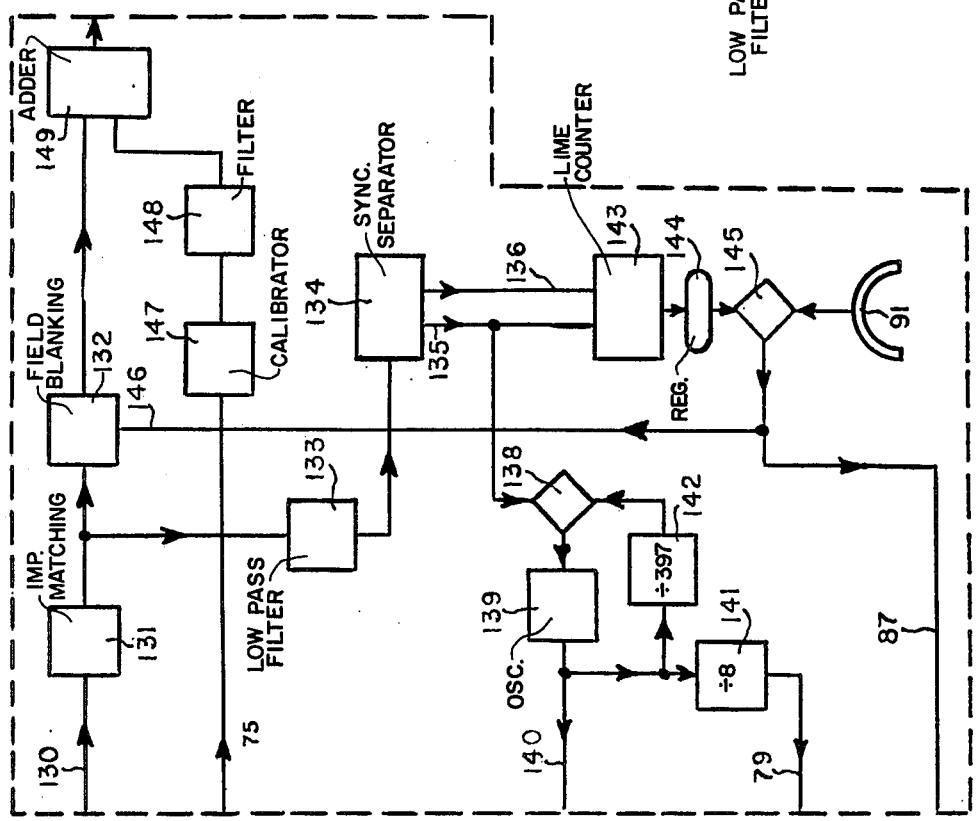
Figure 6:
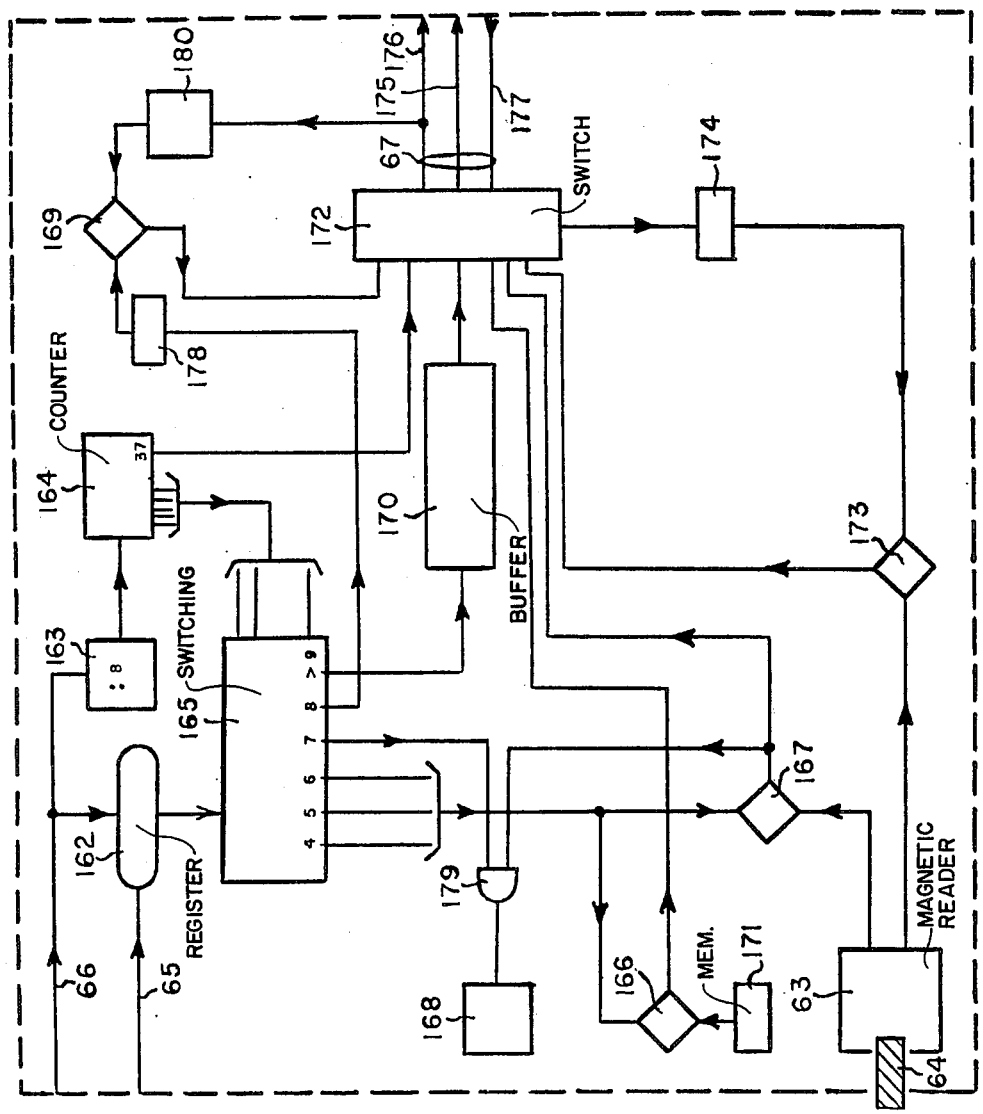
Figure 7:
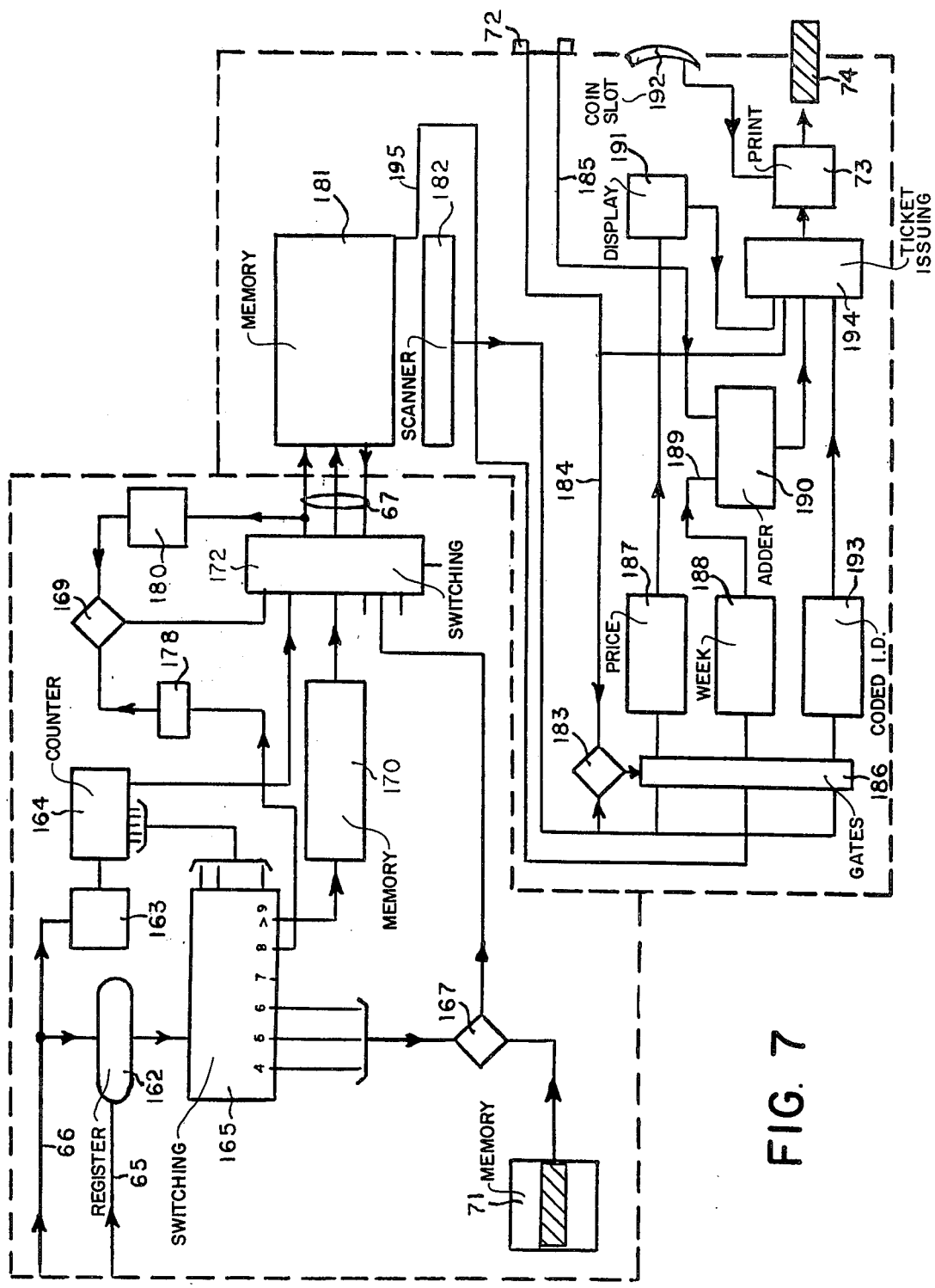

The above mentioned and other features of the present invention will appear more clearly from the following description of an embodiment, the said description being made in conjunction with the accompanying drawings, wherein:

FIG. 1 is a block diagram of the one-way data transmission system according to this invention, FIG. 2 is a diagram of data packs illustrating the operation of the system as shown in FIG. 1, FIG. 3 is a schematic diagram of the logic circuitry in the transmitter equipment, FIG. 4 is the schematic diagram of the modulation circuitry in the transmitter equipment, FIG. 5 is the schematic diagram of the demodulation circuitry in the receiver equipment, FIG. 6 is the schematic diagram of the logic circuitry in the receiver equipment shown in FIG. 5, and FIG. 7 is the schematic diagram of the logic circuitry of a key unit distributor.

The one-way data transmission system shown in FIG. 1 includes a transmitter station comprising a transmitter equipment 41 and a telebroadcasting antenna 42, as well as a plurality of subscriber receiver sets comprising each a reception antenna 43, a television receiver 44 and a data receiver equipment 45, and a plurality of automatic key unit distributors comprising a reception antenna 46, television reception circuits 47 and a receiver equipment 48 delivering key units.

Equipment 41 comprises a so-called "managing" unit 49 the purpose of which is to time multiplex data messages provided from a plurality of data sources which, in the described embodiment, are assumed limited in number to ten data sources 50–59 wherein data source 50 is the date information source, data source 51 is the control information source and data sources 52–59 are various service data sources. Equipment 41 further comprises modulation circuitry 60 receiving, on the one hand, signals applied from managing unit 49 and, on the other hand, video signals from a connection 130, and applying signals to a transmitter, not shown, which supplies antenna 42.

Data applied from managing unit 49 are arranged in data packs according the conventional wording adopted in data transmission networks involving data pack switching. As the system according to this invention must be compatible with television signal standards, each data pack has the same active duration as a television image line. In modulation circuitry 60, data packs are inserted into image signal locations between conventional television line synchronization signals.

Figure 2:
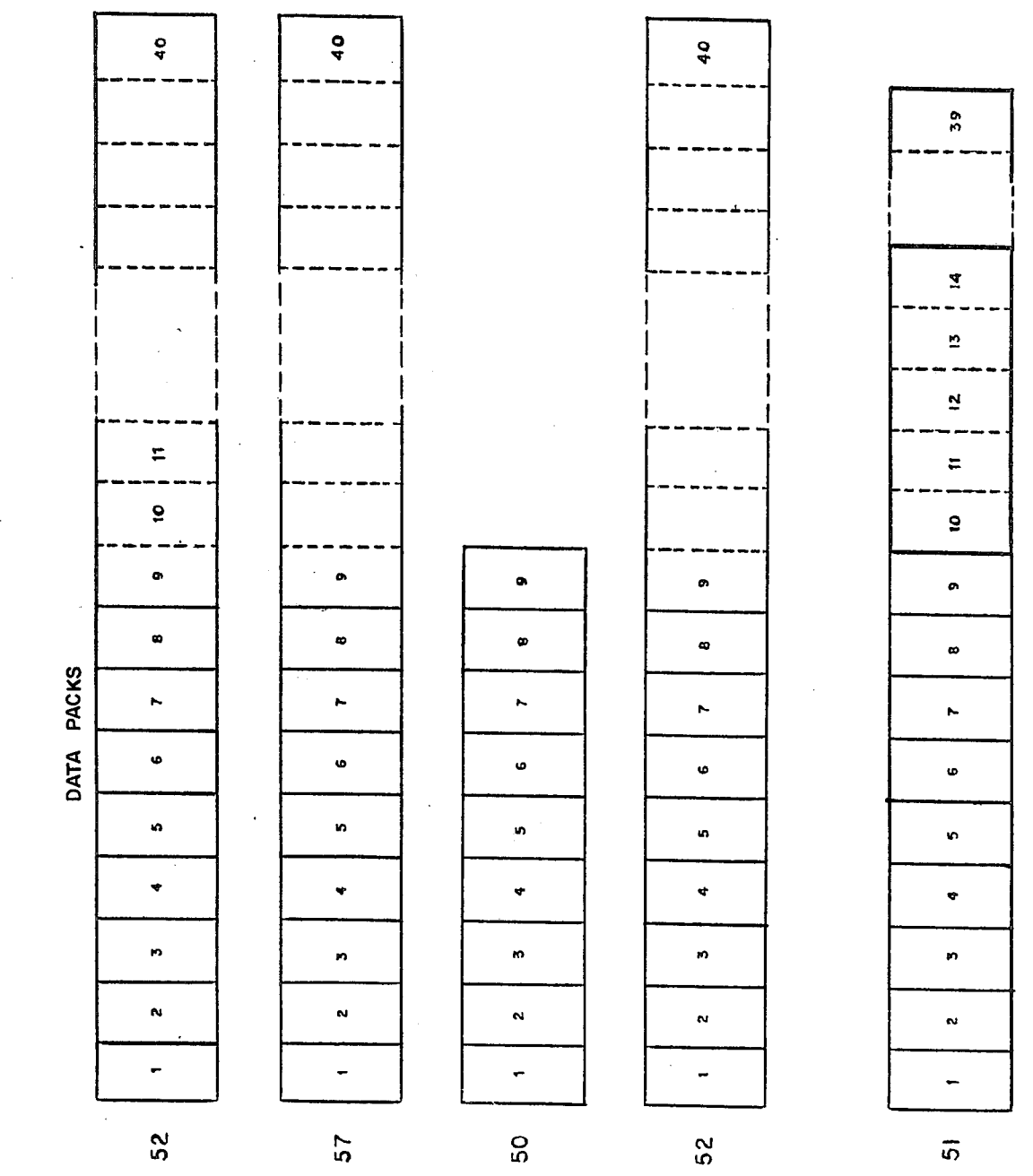

FIG. 2 shows examples of data packs sent from managing unit 49 to 60, then, after having being modulated, radiated from antenna 42.

The first data pack, shown in FIG. 2, has been delivered from data source 52, as indicated by the left-hand numerical reference. The data pack is 40 octets long, the 40 octets being numbered from 1 to 40; the data pack is composed of two parts; the first part, called prefix, is elaborated under control of managing unit 49 and composed of the eight octets 1-8; the second part is composed of octets 9-90 and constitutes the properly said data in a pack. Of course those properly said data might occupy less than 32 octets.

In the prefix the two octets 1 and 2 are allotted to the pack synchronization and for example each comprise the sequence of bits 10101010; the so-called "beginning" octet 3 conventionally permits to synchronize octet-by-octet the receiver equipment operation and may correspond to the bit sequence 11100111; octets 4–6 are allotted to the service identification and enerated in coded form by the managing unit 49 while they correspond in clear to the identity of the source 52 known to the receiver equipment user; practically octets 5 and 6 may also be utilized for detecting and/or correcting transmission errors, if any; alternatively 1 bit in octets 4–8 may also be used for parity check; octet 7 indicates the pack index and permits to recognize in the receiver equipment whether or not a message has been lost; finally octet 8 indicates the pack format, i.e. in the case of incomplete pack the number of the last octet having a meaning.

The second pack shown in FIG. 2 has been delivered from data source 57 and basically has the same structure as the first one.

The third pack has been delivered from source 50 and corresponds to the date channel. The prefix structure is the same as that of the above mentioned first and second packs. Octet 9 which alone contains data carries the date information, that is for example the number of a week in a year. As it will be described later, every receiver equipment 45 includes the date channel key and thus can recognize octets 4–6 of the date channel which allow it to receive the date information.

The fourth pack still corresponds to a pack of a message delivered from source 52.

The fifth pack has been delivered from source 51 which corresponds to the control information channel whose data are intended only for key unit distributors, that is for equipments 48. Each elementary control information involves five successive octets amongst which the first one corresponds to the rank of a data source 52-59, the second, third and fourth ones corresponds to the coded service identification, that is they are identical to octets 4–6 in the prefix of packs delivered from the associated data source, finally the fifth octet corresponds to the rate, that is to the price to be paid for a period unity of subscription to the service provided from the associated data source. In the control pack control information may be preceded by date information in octet 9. To be noted that the fifth data pack permits to transmit control information relative to six data sources or service channels.

Also to be noted that, in the described system embodiment, it is assumed that only certain lines in a television frame are available for the transmission of data packs.

Again with reference to FIG. 1, television receiver 44 delivers from its video output video signals to equipment 45. Equipment 45 comprises a demodulator circuitry 61 and a logic circuitry 62, as well as a reader 63 to read out a magnetic ticket 64. Demodulator circuitry 61 delivers from 65 a bit clock signal to 62 and from 66 the 37 × 8 last bits of a pack. Information read out in reader 63 are continuously applied to 62. Logic circuitry 62 delivers from 67 the data pack octets to a suitable terminal equipment, not shown, as well as from 68 the video signal applied from 44.

The television circuit 47, associated to the automatic distributor, includes the demodulation circuits of any television receiver and transmits video signals to equipment 48. Equipment 48 comprises a demodulator circuitry 69, identical to 61, and a logic circuitry 70, as well as a memory 71 permanently storing the control channel identification. Further it comprises a data input device 72 provided with a push-button board and a coin-box apparatus available to the users, which delivers a magnetic ticket 74. In operation the user dials in clear on the push-button board the identity of the wished service for a subscription as well as the number of the wished subscription unity period. Depending on control information received from control channel the automatic distributor displays the subscription unity period rate. When the user has put into the coin-box apparatus the number of coins corresponding to the displayed rate, the distributor delivers the magnetic ticket 74 which carries the coded service identification and the wished subscription period. In addition the ticket carries, printed in clear, the name of the service, the subscription period and the price paid.

Obviously it must be understood that, even if the key unit, that is the unit containing the coded service identification and the subscription period, is a magnetic ticket in the described system embodiment, such an embodiment of the key unit is not limitative. For example the system may also be designed with punched cards, dead memories, etc.

FIG. 3 shows a bus 75, a control circuit 76 and one among a plurality of couplers 77 connecting data sources 50–59 to bus 75. Practically bus 75, control circuit 76 and couplers 77 constitute the managing unit 49. Control circuit 76 is connected to bus 75 and may order couplers 77 to connect themselves to bus 75.

Control circuit 76 comprises a logic interrogation circuit 78 which sends, at a clock frequency F applied from 79, addresses of couplers 77 to bus 75 through line 80 and to response register circuit 82 through line 81. Circuit 82 is connected to bus 75 through line 83 for receiving responses from those couplers which are ready to transmit. Output of circuit 82 is connected through 84 to a circuit 85 containing a dispatch pile, that is the addresses of those couplers which are ready to transmit. A circuit 86 monitoring the pile receives transmission orders through 87 and selects in 85 through 88 the address of the coupler 77 to which a transmission order has to be transmitted. That address and the transmission order are transmitted through 89 to bus 75 and the selected coupler. Finally, in 76, a key board 91 operated by the operator who controls the managing unit 49 permits to modify information contained in couplers such as particularly the coded identification, the mean operation bit rate. Obviously the key board 91 is connected to bus 75.

In coupler 77 addresses from 80 are applied through line 93 connected to the first input of an AND gate 90 whose output is connected to the input of an address detector circuit 92. Circuit 92 delivers an output signal when it recognizes the address of the associated coupler. Output of 92 is connected through 94 to the first input of an AND gate 95 whose output is connected, on the one hand, to 75 through 96 and, on the other hand, to input 1 of a flip-flop 126 whose output 0 is reset after each pack transmission. Output 0 of flip-flop 126 is connected to the second input of AND gate 90. Practically flip-flop 126 avoids to select several times a ready coupler before triggering the transmission order.

A memory 97 is provided which is connected to bus 75 through line 98 and contains the three identification octets 4–6 for each pack prefix delivered from the associated coupler 77.

Data from the data source associated to the coupler 77 are transmitted through a junction 99 of the same type as that described in the French Patent Application No. 74 13136 filed on Apr. 16, 1974, entitled "standardized communication interface device" and published under number 2,268,308. Such a junction 99 comprises eight wires 100 which transmit the bits octet by octet, a wire 101 or DOP the level of which controlled by the source indicates whether or not data are are available from the source, and a wire 102 or PAR the level of which is controlled by the coupler indicates whether or not the coupler is ready to receive data from the source. In the described embodiment, the data are applied by 99 to an input logic circuit 103 whose output is connected to a data buffer memory 104 through line 105. Circuit 103 is connected to bus 75 through line 106 which transmits to it an operation order from the key board 91. Wire 101 which transmits a condition change for each octet transmitted through 100 is connected to the input of an octet counter 107 whose output is connected to a register 108 which contains the number of octets transmitted from 103 to buffer memory 104. Register 108 has a reset input connected from bus 75 through line 109, an output connected to the first input of an AND gate 110 and an output connected to memory 104.

Buffer memory 104 is made of two parts, the one 111 wherein stored are the pack prefix octets and the second 112 wherein stored are data octets from the source through 103. Part 111 has a first input connected from memory 113 containing synchronization and beginning octets 1–3, a second input connected from memory 97, a third input connected to pack counter 114 which delivers the pack number, that is the index octet, and a fourth input connected to register 108 which delivers the count of the octets stored in part 112, that is the format octet.

An output of register 108 is also connected to the first input of a comparator 115 whose the second input is connected from output of a memory 116 containing the number 32 which corresponds to the maximum number of data octets allowable to be transmitted in a pack.

Output of 115 is connected, on the one hand, to a control input of 103 precluding operation of 103 when the number of octets counted in 108 is equal to 32 and, on the other hand, to the first input of an AND gate 117.

Furthermore coupler 77 comprises a transmission simulator 118 which receives an operation rate indication from key-board 91 through bus 75 and line 119. That operation rate indication is determined as a function of the operation speed or rate of the receiver equipments capable to receive the data from the data source associated to the coupler. Indeed, as data broadcasting is a one-way transmission, it is necessary to avoid that data packs be broadcasted at a too high rate to be processed in receiver equipments and data receivers associated thereto. With such a rate information simulator 118 simulates emptying operations in buffer memory 104, those emptying operations being counted in a counter 120 connected to ouput of 118. Outputs 1–4 of 120 respectively correspond to counts 1–4 and are connected to the inputs of an OR gate 121 whose output is connected to the second input of AND gate 95. In addition output of AND gate 110 is connected to a control input of 103 which precludes 103 from operating when gate 110 is on.

Output of memory 104 is connected to a logic transmission circuit 123 which receives from bus 75 through line 124 the clock frequency signal for delivering bits, and through line 125 the transmission order from line 89. Output of circuit 123 is connected to bus 75 through line 127 which serially transmits the pack, bit by bit, toward the modulation circuit of the transmission equipment. Line 125 is also connected to the input of counter 114 that counts the packs transmitted from coupler 77.

The operation of control circuit 76 and coupler 77 is as follows. Each time a clock signal is received from 79, circuit 78 transmits through line 80 an address of a coupler which is received through 93 and 90 and, if the coupler corresponds to the transmitted address, recognized by circuit 92 that puts on an input of AND gate 95. On the other hand, it may be assumed that, in that coupler, the part 112 of memory 104 is full, that is it contains 32 data octets. Therefore comparator 115 puts on an input of AND gate 117. Finally it is assumed that counter 120 is in 1-condition, that is gate 121 puts on the other input of gate 117 whose output puts on the second input of gate 95 through 122. Gate 95 delivers a signal through 96 which means that that coupler the address of which has just been sent from 76 is ready to transmit, the signal delivered from gate 95 being received in 82 through 83 simultaneously with the coupler address through 81. The said address is sent to circuit 85, then possibly processed depending on the priority allotted to the service corresponding to the coupler and, when the priority condition causes the associated coupler to be processed when receiving a transmission order through 87, the said address together with a transmission order are sent through 89 and 125 and received in 123 which causes the read-out of buffer memory 104, bit by bit, through 103. Then 120, 126 and 108 are reset, and pack counter 114 is incremented by 1.

When the data source associated to the coupler transmits data octets at a relatively slow rate, le counter 120 may already be in condition 2 or 3 at the moment the coupler address is received in 92. If counter 108 contains 32, the coupler will operate in a same manner as already described. If counter has not reached 32, the address disappears on 93 and 92 is reset. There is no reply. When the source is still lower, counter 120 may have reached condition 4 while part 112 of 104 is not full. Then register 108 contains a number lower than 32, gate 117 cannot be turned on, but that output of 108 which is connected to 110 is turned on and indicates that there is at least one octet stored in 112 which turns 110 on which in turn turns 95 on through 122. Then the same operation as above described is resumed. To be noted that in the two first cases register 108 delivers a format octet with a value 32 while in the last case it delivers a format octet indicating the actual number of data octets stored in 112. When there is no octet stored in 112, gate 110 cannot be turned on and the coupler 77 is never ready to transmit. Such a case may occur when the data source has nothing to be transmitted or when circuit 103 is not operated by 106.

To be noted that the data source operator transmits only data having actual meaning for the user and all control data are added in the coupler under the control of circuit 76 and particularly key-board 91. Those couplers which are associated respectively to source 50 and 51 are identical to the described coupler 77.

The modulation circuitry 60 of the transmission equipment is shown in FIG. 4. The video input 130 is connected to a conventional impedance matching circuit 131 whose output is connected, on the one hand, to a field-blanking circuit 132 and, on the other hand, to a low-pass filter 133. Output of filter 133 is connected to the input of a circuit 134 which can separate line and frame synchronization signals and deliver from 135 a line frequency signal and from 136 a frame frequency signal.

The signal delivered from 135 is applied to the first input of a phase comparator 138 whose output is connected to the control input of a variable controlled oscillator 139 whose output delivers reference signals at the bit frequency to bus 75, FIG. 3, through line 140. Furthermore output of oscillator 139 is connected, on the one hand, to a divider-by-eight 141 which delivers from 79 clock frequency signals and, on the other hand, to a divider-by-397 142 whose output is connected to the second input of phase comparator 138. The ratio equal to 397 between the bit frequency and the line frequency is determined by line scanning duration considerations regarding a 625-line standard system taking into account the fact that spurious structures must be keep at a minimum in the picture. In addition signal from 135 is applied to a television line counter 143 that delivers to a line number register 144 the number of the picture line which will be scanned. Register 144 is connected to the first input of a digital comparator 145 whose second input is connected from key-board 91 on which displayed are the numbers of the picture lines usable for transmitting data. When there is an agreement comparator 145 delivers a transmission order signal to 87 and, on the other hand, applies a signal to the control input 146 of the field-blanking circuit 132.

Data from bus 75 are applied to a circuit 147 calibrating data amplitude, output of circuit 147 being connected to the input of a gaussian filter 148. Outputs of both circuits 132 and 148 are connected to the inputs of an adder 149 whose output is connected to the antenna.

Thus, at a given time if the considered picture line is not a line utilized for transmitting data, input 146 of 132 is not activated and 87 provides no transmission order. Then adder 149 transmits only the video signal from 130 without any change. If the considered line is used to transmit data, the picture signal from 130 is suppressed in 132, but the sync signals are kept and are added to the data signals from 148.

The demodulation circuitry of a subscriber receiver equipment is shown in FIG. 5 and corresponds to the box 45 in FIG. 1. Video signals from television receiver 44 are applied to an impedance matching circuit 150 whose output is first applied to a conventional circuit 151 for restoring the bit frequency, then to a conventional circuit 152 for restoring the D.C. component and finally to a low-pass filter 153. The bit frequency is transmitted from 151 to 62 through line 66. The signal, filtered in 153, is applied to a circuit 154 for separating the conventional video sync signal, the output of circuit 154 being, on the one hand, applied to to the control input of circuit 152 and, on the other hand, to a logic circuit 155 capable to generate a validation strobe for the beginning octet. Output of circuit 152 is connected to the input of a circuit 156 separating data pack and transmitting it to a circuit 157 whose control input is also connected from output of 151 which regenerates the pack bits. On the other hand, output of 156 is also connected to circuit 155 which is responsive, on the one hand, to the video sync signal from 154 and, on the other hand, to the sequence of bits "1" and "0" comprised in pack prefix sync octets 1 and 2 for generating the validation strobe for the beginning octet 3. Output of 155 is connected to a control input of a switching circuit 158 whose data input is connected from output of 157. When output of 155 is activated, the data pack is switched to a beginning octet register 159 from output of 158. Output of 159 is connected to the first input of a digital comparator 160 whose second input is connected from the output of a beginning octet memory 161. When the comparison result is positive, comparator 160 activates the second control input of switching circuit 158 which delivers the 37 × 8 last bits of the pack to line 65 and logic circuitry 62. The operation of circuits 150–161 shown in FIG. 5 is well known to people skilled in the art.

The logic circuitry 62 of the subscriber receiver equipment is shown in FIG. 6. The bit frequency signal is applied, on the one hand, to an octet register 162 and, on the other hand, to a divider-by-eight 163 whose output is connected to the input of an octet counter 164. The pack bits are applied from 65 serially to the data input of octet register 162 which transmits the octets in parallel mode to a switching circuit 165. Octet counter 164 has its first six outputs corresponding to the first six octets received in 62 or octets 4–9 connected to control inputs of circuit 165, those control inputs sequentially activated resulting in selectively switching pack octets successively to output 4 for octet 4, output 5 for octet 5, . . . , output 8 for octet 8, and output 9 for octet 9 plus the remaining octets of the pack. The switching circuit 165 is a conventional circuit known in the art for example as a logic multiplexer.

Outputs 4–6 of 165 are connected to the respective first inputs of a digital comparator 166, on the one hand, and to the respective first inputs of another digital comparator 167, on the other hand. Output 7 of 165 is connected to the first input of an AND gate 179 whose output is connected to a comparator-counter 168. Output 8 of 165 is connected to a format register 178 whose output is connected to the first input of a comparator 169. Finally output 9 of 165 is connected to the data input of a data buffer memory 170.

The second input of comparator 166 is connected from the output of a memory 171 permanently storing the date channel identification, that is octets 4–6 associated to source or channel 50. The output of 166 is connected to a control input of a switching circuit 172.

The second input of comparator 167 is connected from the output of a magnetic reader 63 which reads out of the magnetic ticket 64 information, on the one hand, relative to the source identification, that is the channel to which the subscriber has a subscription and, on the other hand, the subscription week. Identification information is applied to the second input of 167 while week information is applied to the first input of a digital comparator 173. Output of 167 is connected to a control input of switching circuit 172.

Comparator-counter 168 normally contains the number of the expected pack and compares the registered number to that received from output of gate 179. When the comparison result is negative, comparator-counter 168 triggers an alarm indicating that a pack was lost. In addition, the number of the received pack plus one unity is written into comparator-counter 168. For the first received pack there occurs an alarm that the subscriber does not take into account.

The output 37 of octet counter 164 is connected to a control input of circuit 172.

The switching circuit 172 has two outputs, one toward a date register 174 and the other constituting the output 67 from 62. The junction 67 comprises, like 99, a line 175 transmitting the octets from 172 to a processing equipment, not shown, a wire 176 or DOP whose level is controlled by 172 and indicates whether or not data are present, and a wire 177 or PAR whose level is controlled by the said processing equipment and indicates whether or not the said processing equipment is ready to receive data. The wire 176 is connected to an octet counter 180 whose output is connected to the second input of comparator 169 whose output is connected to a control input of 172.

The operation of the logic circuitry, shown in FIG. 6, is as follows. It is first assumed that the receiver equipment receives the date channel 50. Octets 4–6 of channel 50 are applied to 166 that detects an agreement and sends an activation signal to circuit 172 that switches octet 9 toward register 174. Octet 7 has no influence to counter 168 because AND gate 179 is off. Octet 8 having a value 1 is stored in 178, but has no influence to the following operation. Octet 9 is sent from 170 to 172 and 174 as soon as counter 164 reaches count 37. In comparator 173, it is detected whether the week number registered in 174 is in agreement with that read out of the ticket 64 through reader 63. When the response is positive, the corresponding control input of 172 is activated which switches 172 toward output 67.

As long as such an agreement is valid, when for example a pack from source 52 to which the subscription corresponds is received, octets 4–6 for such a pack trigger an agreement in 167 which delivers a signal turning gate 179 on and activating the corresponding control input of 172. Octet 7 is applied to 168 and it will be assumed that the comparison with the pack number already stored in 168 is positive. Octet 8 is sent to register 178. The remaining octets are sent to memory 170. Once count 37 is reached in octet counter 164, a signal is sent to switching circuit 172 that transfers all the contents of memory 170 to output 67. At the transferring of each octet that is detected by wire 176, counter 180 is incremented by one unity. When the contents of 180 are equal to those of 178, comparator 169 sends to 172 a signal indicating that the transmission of data is over. This signal also triggers reinitialization in counter 164.

In the automatic ticket distributor equipment 48, shown in FIG. 1, the demodulation circuitry 69 is identical to circuitry 61 in 45, that is it is shown in FIG. 5. The logic circuitry 70, as well as circuits 71-73, are shown in FIG. 7 wherein those circuits which have the same functions in 62 and 70 are indicated by the same numerical references.

Circuitry 69 delivers the bit frequency from 66 and serially data bits from 65. The pack is arranged in parallel octets in 162, then the octets are applied to 165. As the distributor must operate at any date, there is no date detection contrary to what occurs in a subscriber receiver equipment, and outputs 4–6 of 165 are only connected to the respective first inputs of comparator 167. The second inputs of 167 are connected from a memory 71 which permanently stores the control channel identification. The corresponding output of 167 is connected to a corresponding control input of switching circuit 172.

Output 7 for the pack index octet in 165 is not used because the control channel packs are repeated at a suitable relatively high rate. Output 8 is connected to 178 that is connected to 169, as shown in FIG. 6. Output 9 is connected to memory 170 that is connected to switching circuit 172. The circuit 172 is permanently switched to 67. The operation of the assembly of the above mentioned circuits, shown in FIG. 7, may be obviously directly derived from that of circuits shown in FIG. 6, in 62.

In 69, the processing equipment processing the pack transmitted from 172 comprises a memory 181 for storing all the control information relative to all the service channels, i.e. in the described embodiment channels 52–59. Practically information contained in 181 is partially refreshed or updated at each control information pack reception since a pack only concerns information relative to a maximum of six channels, as indicated with reference to FIG. 2. Memory 181 is associated to a scanner 182 which cyclically reads it out at a suitable repetition rate for successively transmitting the five octets relative to a channel to a comparator 183 and a set of gates 186.

The second input of comparator 183 is connected through 184 from the push-button board possibly actuated by a user who dials the name of the service which he wishes to subscribe to, such a name of service being assumed for simplification purpose to be the natural rank of the source, i.e. a figure from 1 to 8. The set of gates 186 has its control input connected from comparator 183. Gates 186 may transfer to a converter circuit 187 the price rate octet which is converted in decimal figures in a display device 191 connected from ouput of 187. Gates 186 may also transfer identification octets directly to a register 193. Finally gates 186 may transmit to a register 188 the week number from 181 through 195, such a number being contained in control pack octet 9 and being permanently available through line 195. In addition the push-button board 72 allows the user to dial a number determining the week for which he wishes to subscribe. When it is the current week, that number may for instance be "0", when it is the next week, it may be "1", etc. That number is sent to one input of an adder 190 whose other input is connected from output of 188.

The display device 191 is still connected to a ticket issuing circuit 194 which is connected from respective outputs of 72, 190 and 193. Finally the distributor still comprises a coin-box apparatus having one or several slots 192 into which the user puts coins corresponding to the price indicated by 191. The device 192 is connected to the control input of the ticket printing machine 73 whose data input is connected from output of 194. The printing machine 73 may deliver a ticket 74. The connection from 72 to 194 serves to transmit the clear number of the wished service.

The operation of the distributor is as follows. The user dials on the push-button board 72 the number of the wished service and the number of the wished week. The scanner 182 which operates a high rate makes the channel number octet to pass in succession at the first input of 183. When there is an agreement in 183, The later turns gates 186 on and they transfer the price rate into 187 the number of the present week into 188 and the coded identification into 193. The price rate is displayed on 191. On the other hand adder 190 adds the number of the present week to that dialled on 72 for delivering to 194 the number of the subscription week. Information that is actually present in 194 is then the number of the service, the price rate in clear, the coded number of the subscribed week (and optionally in clear) and the coded identification. The user pays the displayed price rate which allows the printing machine 73 to operate. Preferably the ticket 74 carries in clear the name of the service, the number of the week, the price paid, and coded the number of the week and the identification.

It must be well understood that the system that has just been described may involve alternatives without being out of the scope of this invention. Thus the subscription unity period may be the month instead of the week, etc. Likely the number of octets used for the coded identification may reduced down to one or two.

The system may also be utilized without automatic ticket distributors, the tickets being distributed through another organization, such as the Post Office organization, etc.

On the other hand, the date channel may be the same as the control channel, the subscriber receiver equipment being then modified as follows. The memory 171 contains the identification of control channel 51, output of 166 operating circuit 172 only to pass octet 9 to register 174, and the remaining octets being lost in the subscriber receiver equipment. Memory 181 and scanner 182 may also be replaced by simpler means in the distributor so as to directly send the control pack toward 183 and 186.

Finally the system may be utilized with any one-way transmission means that is capable to transmit a standard television signal, such as a CATV network, for instance instead of radio broadcasting.

While the principles of the present invention have been described above in relation with a particular embodiment, it must be clearly understood that the said description has only been made by way of example and does not limit the scope of this invention.

What is claimed is:

1. An one-way data transmission system wherein
the transmitter station transmits data in the form of data packs, from a plurality of channels, the data packs from said plurality of channels are time multiplexed, each data pack comprises a prefix coded signal, in addition to the conventional synchronization and service signals, wherein
one channel amongst the plurality of channels is allotted to the transmission of a date information, each receiver equipment comprising means for comparing each pack prefix code with a channel code stored in a dead memory, each dead memory containing in addition to the channel code, a subscription period information, said receiver equipment comprising means for receiving the date channel information from the date channel and comparing said date channel information with the subscription period information stored in the dead memory and which, when the comparison result is positive, delivers a first validation signal, and said means for comparing the prefix code to the dead memory channel code and delivering a second validation signal when the second comparison result is positive, the first and second validation signals being combined for validating the received pack having caused the second validation signal.

2. A one-way data transmission system according to claim 1, wherein automatic key unit distributors are provided, each key unit serving as a dead memory, each distributor comprising a data receiver equipment wherein the dead memory stores the code of a control channel amongst the said plurality of channels, the control channel data being transmitted from the transmitter station as current channel data or date channel data, the said distributor comprising a date memory for storing the date information and receiving means for processing data received from the control channel and date memory data and combining them with data resulting from actuations applied to the distributor by a user so as to deliver a key unit corresponding to user's actuations when he has put into the distributor the number of coins or banknotes corresponding to the channel and the subscription period indicated by the said actuations.

3. A one-way data transmission system according to claim 1, wherein automatic key unit distributors are provided, each key unit serving as a dead memory, each distributor comprising a data receiver equipment wherein the dead memory stores the code of a control channel amongst the said plurality of channels, the control channel data being transmitted from the transmitter station as current channel data or date channel data, the said distributor comprising receiving means for receiving each control channel pack which includes the date information and control information to be combined with data resulting from actuations applied to the distributor by a user so as to deliver a key unit corresponding to user's actuations when he has put into the distributor the number of coins or banknotes corresponding to the channel and the subscription period indicated by the aid actuations.

4. A one-way data transmission system according to claim 3, wherein control channel data are constituted of date information followed with a sequence of channel codes, each channel code being preceded by the number of the associated channel, wherein the distributor receiving means comprises a comparator comparing the channel number dialled by the user with the channel numbers preceding the received channel codes, an extractor deriving the date information, the channel code and the price rate when the said comparator delivers a positive output, a display device displaying the extracted price rate, a calculation circuit delivering a subscription information from date information and user's actuations, and a processor processing the channel code and the subscription information for, after payment by the user according to the displayed price rate, delivering a key unit.

5. A one-way data transmission system according to claim 3, wherein the distributor comprises a control channel data memory that is regularly updated with received control channel data, the said memory being associated to a scanner which reads the said memory out when a user actuates the distributor, read-out data being sent to the said receiving means.

6. A one-way data transmission system according to claim 2, wherein the date channel and the control channel constitutes a single channel, the data receiver equipments, other than those comprised in the said distributors, includes means for keeping from the said single channel data only the date information.

7. A one-way data transmission system according to claim 1, wherein the transmission means transmitting the said data is a one-way transmission means capable to transmit a standard television signal, the data packs being inserted between the line sync signals.

8. A one-way data transmission system according to claim 7, wherein the said transmission means is radio broadcasting means.

* * * * *

UNITED STATES PATENT AND TRADEMARK OFFICE
CERTIFICATE OF CORRECTION

PATENT NO. : 4,058,830
DATED : Nov. 15, 1977
INVENTOR(S) : Guinet & Noirel

It is certified that error appears in the above-identified patent and that said Letters Patent are hereby corrected as shown below:

Col. 1, line 49, change "received" to --receive--

Col. 1, line 64, change "puched" to --punched--

Col. 4, line 25, change "9-90" to --9-40--

Col. 4, line 53, delete "a"

Col. 4, line 54, change "week" to --weeks--

Col. 6, line 36, delete duplicate "are"

Col. 9, line 14, delete duplicate "to"

Col. 12, line 15, "The" s/b --the--; "later" s/b --latter--

Col. 12, line 20, "dialled" s/b --dialed--

Col. 14, line 7, change "aid" to --said--

Col. 14, line 14, "dialled" s/b --dialed--

Signed and Sealed this

Twentieth Day of June 1978

[SEAL]

Attest:

RUTH C. MASON
Attesting Officer

DONALD W. BANNER
Commissioner of Patents and Trademarks